United States Patent
Chen et al.

(10) Patent No.: US 10,289,278 B2
(45) Date of Patent: May 14, 2019

(54) DISPLAYING WEBPAGE INFORMATION OF PARENT TAB ASSOCIATED WITH NEW CHILD TAB ON GRAPHICAL USER INTERFACE

(71) Applicant: International Business Machines Corporation, Armonk, NY (US)

(72) Inventors: Luke Chen, Taipei (TW); Paige Chen, Taipei (TW); Ken Liu, Taipei (TW); Paul Yuan, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 14/948,478

(22) Filed: Nov. 23, 2015

(65) Prior Publication Data
US 2016/0188138 A1    Jun. 30, 2016

(30) Foreign Application Priority Data
Dec. 31, 2014  (TW) .............................. 103146695 A

(51) Int. Cl.
*G06F 3/0483* (2013.01)
*G06F 17/30* (2006.01)

(52) U.S. Cl.
CPC ...... *G06F 3/0483* (2013.01); *G06F 17/30899* (2013.01)

(58) Field of Classification Search
CPC ......................... G06F 3/0483; G06F 17/30899
See application file for complete search history.

(56) References Cited

U.S. PATENT DOCUMENTS

| | | | | |
|---|---|---|---|---|
| 5,937,417 A | * | 8/1999 | Nielsen ................... | G06F 17/24 707/E17.013 |
| 6,078,935 A | * | 6/2000 | Nielsen ................... | G06F 17/24 707/E17.013 |
| 6,330,976 B1 | * | 12/2001 | Dymetman ......... | G06F 3/03545 235/487 |
| 6,404,441 B1 | * | 6/2002 | Chailleux ............. | G06F 3/0481 715/704 |
| 6,643,641 B1 | * | 11/2003 | Snyder .............. | G06F 17/30864 707/709 |

(Continued)

FOREIGN PATENT DOCUMENTS

TW        201216093        4/2012

OTHER PUBLICATIONS

IBM, Method and System for Coordinating Development of Innovation Based Projects between Business Partners, Original Publication Date: Mar. 2, 2010, IP.com No. 000193558, 6 pages.

(Continued)

*Primary Examiner* — Jung-Mu T Chuang
(74) *Attorney, Agent, or Firm* — Schmeiser, Olsen & Watts, LLP; Mark Vallone

(57) ABSTRACT

Provided are a method, computer program product and computer system for displaying webpage information of a parent tab associated with a new child tab on a graphical user interface. The method includes the following steps: opening a link for identifying a new tab in a new webpage from a parent webpage; creating the new tab; recording a position of the link; capturing a screen of the parent webpage to generate a screenshot; highlighting the link in the screenshot; and saving the screenshot with the highlighted link to a tooltip attribute of the new tab.

11 Claims, 6 Drawing Sheets

(56) References Cited

U.S. PATENT DOCUMENTS

| | | | |
|---|---|---|---|
| 6,925,496 B1 | 8/2005 | Ingram et al. | |
| 7,020,721 B1* | 3/2006 | Levenberg | H04L 67/2828 709/218 |
| 7,188,317 B1 | 3/2007 | Hazel | |
| 7,325,188 B1* | 1/2008 | Covington | G06F 17/3089 707/E17.116 |
| 7,447,998 B2 | 11/2008 | Hutcheson et al. | |
| 7,546,602 B2* | 6/2009 | Hejlsberg | G06F 9/54 717/114 |
| 7,685,519 B1* | 3/2010 | Duncan | G06F 9/4446 715/705 |
| 7,689,916 B1* | 3/2010 | Goel | G06F 3/04812 715/711 |
| 7,707,262 B1* | 4/2010 | Bill | G06Q 10/00 709/204 |
| 7,890,881 B1* | 2/2011 | Skidgel | G06F 17/212 715/243 |
| 7,899,803 B2* | 3/2011 | Cotter | G06F 17/30864 707/706 |
| 8,060,389 B2* | 11/2011 | Johnson | H04L 69/329 705/6 |
| 8,073,565 B2* | 12/2011 | Johnson | H04W 76/11 700/245 |
| 8,108,371 B2* | 1/2012 | Dharmarajan | G06F 17/30864 707/705 |
| 8,266,544 B1* | 9/2012 | Kay | G06F 21/53 715/760 |
| 8,499,065 B2 | 7/2013 | Ross et al. | |
| 8,522,148 B1* | 8/2013 | Pry | G06F 17/30864 715/745 |
| 8,548,874 B2* | 10/2013 | Nations | G06Q 30/0623 235/487 |
| 8,601,087 B2* | 12/2013 | Korman | G06F 15/16 709/213 |
| 8,631,340 B2 | 1/2014 | Schreiner et al. | |
| 8,725,860 B1* | 5/2014 | Voltmer | H04L 41/50 709/220 |
| 8,762,879 B1* | 6/2014 | Goodger | G06F 17/30899 715/738 |
| 8,924,374 B2* | 12/2014 | Dexter | G06F 17/30675 707/722 |
| 9,081,833 B1* | 7/2015 | Unger | G06F 17/30554 |
| 9,208,316 B1* | 12/2015 | Hill | G06F 21/566 |
| 9,213,625 B1* | 12/2015 | Schrage | G06F 11/3688 |
| 9,749,202 B1* | 8/2017 | Jain | H04L 43/04 |
| 2003/0177282 A1* | 9/2003 | Hejlsberg | G06F 9/54 719/328 |
| 2004/0254884 A1* | 12/2004 | Haber | G06Q 10/10 705/51 |
| 2004/0254942 A1* | 12/2004 | Error | G06F 17/3089 |
| 2006/0123341 A1* | 6/2006 | Smirnov | G06F 3/0481 715/708 |
| 2006/0161847 A1 | 7/2006 | Holecek et al. | |
| 2006/0179415 A1* | 8/2006 | Cadiz | G06F 17/30867 715/838 |
| 2007/0027887 A1* | 2/2007 | Baldwin | G06F 17/279 |
| 2007/0174249 A1* | 7/2007 | James | G06F 17/3089 |
| 2007/0180381 A1* | 8/2007 | Rice | G06F 17/30905 715/711 |
| 2008/0022229 A1 | 1/2008 | Bhumkar et al. | |
| 2008/0134093 A1* | 6/2008 | Dharmarajan | G06F 17/30696 715/838 |
| 2008/0148193 A1* | 6/2008 | Moetteli | G06F 17/30873 715/854 |
| 2008/0201326 A1* | 8/2008 | Cotter | G06F 17/30864 |
| 2009/0006201 A1* | 1/2009 | Faseler, Jr. | G06F 17/30873 705/14.73 |
| 2009/0024946 A1* | 1/2009 | Gotz | G06F 17/3089 715/769 |
| 2009/0063997 A1 | 3/2009 | Naick et al. | |
| 2009/0150769 A1* | 6/2009 | Konnola | G06F 17/30864 715/251 |
| 2009/0327947 A1 | 12/2009 | Schreiner et al. | |
| 2010/0319070 A1* | 12/2010 | Born | G06F 21/51 726/23 |
| 2011/0191722 A1* | 8/2011 | Gill | G06Q 10/20 715/841 |
| 2011/0225232 A1 | 9/2011 | Casalaina et al. | |
| 2011/0314376 A1* | 12/2011 | Dearman | G06F 3/0481 715/711 |
| 2012/0162160 A1* | 6/2012 | Amano | G06F 9/4443 345/204 |
| 2012/0185609 A1* | 7/2012 | Keohane | G06F 17/30887 709/245 |
| 2012/0240030 A1* | 9/2012 | Shriber | G06F 17/30867 715/234 |
| 2012/0246561 A1* | 9/2012 | Doig | G06F 17/30864 715/255 |
| 2013/0054299 A1* | 2/2013 | Deshpande | G06Q 10/06 705/7.26 |
| 2013/0054672 A1* | 2/2013 | Stilling | G06F 17/30899 709/202 |
| 2013/0275422 A1* | 10/2013 | Silber | G06F 17/30864 707/728 |
| 2014/0304588 A1* | 10/2014 | Li | G06F 17/30905 715/234 |
| 2015/0066629 A1* | 3/2015 | Seiler | G06Q 30/0244 705/14.43 |
| 2016/0232144 A1* | 8/2016 | Zhou | H04L 67/34 |

OTHER PUBLICATIONS

System and Method for Enhancing User Experience in Multi-tab Window, IP.com Electronic Publication: Feb. 22, 2012, IP.com No. 000215222, 8 pages.

IBM, one method to manage tabs in multi-tab applications, Original Publication Date: Oct. 15, 2009, IP.com No. 000188626, 7 pages.

* cited by examiner

DISPLAYING WEBPAGE INFORMATION OF PARENT TAB ASSOCIATED WITH NEW CHILD TAB ON GRAPHICAL USER INTERFACE

TECHNICAL FIELD

The present invention relates to displaying webpage information of a parent tab associated with a new child tab on a graphical user interface.

BACKGROUND

Daily activities require a wide variety of information devices, such as mobile phones, personal computers, notebook computers, and tablets. Due to widespread network use, users use handy information devices with web browsers, such as Microsoft Internet Explorer®, Mozilla Firefox®, Apple Safari®, and Google Chrome®, to view text, images, and other multimedia information posted on one or more webpages. Basically, the web browsers each comprise a graphical user interface (GUI) for enabling a user to view multiple webpages in different windows and/or to launch on a single source page multiple webpages from multiple links. For instance, the user views a webpage by clicking one of a series of links on a resultant webpage found by a search, and then goes back to the resultant webpage, and subsequently clicks another different link on the resultant webpage to view other webpages.

In a tabbed web browser, multiple webpages are displayed within a single window in tabs. The user can view the tab only one by one. The tab is essentially for use in identifying a specific opened webpage. The user selects/identifies the tab of an opened webpage on a tabbed user interface and displays the webpage in the window. Hence, a selected tab related to a webpage being displayed in a window is called as an active tab, whereas one or more unselected tabs related to the other opened webpages not being displayed in the window are called as inactive tabs (i.e., hidden webpages).

The user usually launches a webpage by opening a link in a new tab provided by a resultant webpage, an index webpage, or any webpage having multiple links, which may be found by a search. As a result, after viewing the webpages of the new tabs, or after opening multiple new links among multiple new webpages provided by multiple identifiable new tabs from parent tabs, the user is likely to forget which link, in a webpage of a parent tab, has been clicked on for the purpose of the creation of the current new tabs.

However, the prior art fails to readily identify which link, in a webpage of a parent tab, the new tab is from. Moreover, in conventional tabbed web browsers, a title of a new tab often differs from a name of a link, as shown in the webpage of parent tab, for the creation of the new tab. As a result, in the webpage of parent tab, the user is unlikely to find the parent link which the new tab is from.

FIG. 1A illustrates a frame of a webpage on a conventional browser display interface, in accordance with the prior art.

Referring to FIG. 1A, a tabbed web browser 100 comprises a parent tab 102. Three links 114, 116, 118 in a webpage of the parent tab 102 have ever been clicked on for the creation of three new child tabs 104, 106, 108, respectively. However, tab titles of the three new child tabs 104, 106, 108 are different from names of the three links 114, 116, 118. For instance, the names of the three links 114, 116, 118 are "nine Practice", "Security Resources", and "Start Africa Course", respectively, whereas the tab titles of the three new child tabs 104, 106, 108 are "IBM 1-3-9 Home", "Security—Think Academy Wiki", and "Think Academy Africa", respectively.

FIG. 1B illustrates a tab bar and a tooltip 110 of a webpage on the conventional browser display interface, in accordance with the prior art. If a cursor 109 of a pointing device (e.g., a mouse) of a user hovers above the new tab, the tooltip 110 of the Uniform Resource Locator (URL) of a webpage which contains the tab title and/or new tab is presented to the user.

Known existing tab management technology presents to users the tabbed relationship between a parent tab and a new child tab, such as a plug-in of Mozilla Firefox®, and the tree hierarchy of the tabs provided by Tree Style Tab (tree diagram tab directory management).

SUMMARY

The method of the present invention provides that when a user clicks on a link in a parent webpage pf a parent tab and then creates a corresponding new child tab, a screen capture to the webpage of the parent tab is performed by triggering a snapshot mechanism, in such a way a screenshot is generated and at the same time the link being clicked is highlighted. By using a graphical reminder having the screenshot and the highlighted link, such as a tooltip, the user can easily backtrack a webpage of a parent tab (i.e., source webpage) and its related link. Even if the parent webpage of the parent tab has been closed, the parent webpage can be re-opened by clicking on the screenshot to load the parent URL.

In accordance with one embodiment of the present invention, the present invention provides a method for displaying webpage information of a parent tab associated with a new child tab on a graphical user interface, the method comprising the steps of: opening a link from a parent webpage of a parent tab for identifying a new tab of a new webpage; creating the new tab; recording a position of the link; capturing a screen of the parent webpage to generate a screenshot; highlighting the link in the screenshot; and saving the screenshot with the highlighted link to a tooltip attribute of the new tab.

The present invention also provides a computer program product stored in a computer-usable medium, the computer program product comprising a computer-readable program executable on a computer to implement the aforementioned methods.

In accordance with one another embodiment of the present invention, the present invention provides a computer system for displaying webpage information of a parent tab associated with anew child tab on a graphical user interface, the computer system comprising a host, the host comprising: a bus system; a memory connecting the bus system, wherein the memory includes a set of instructions; and a processing unit connecting the bus system, wherein the processing unit executes the set of instructions to implement the aforementioned method.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1A:
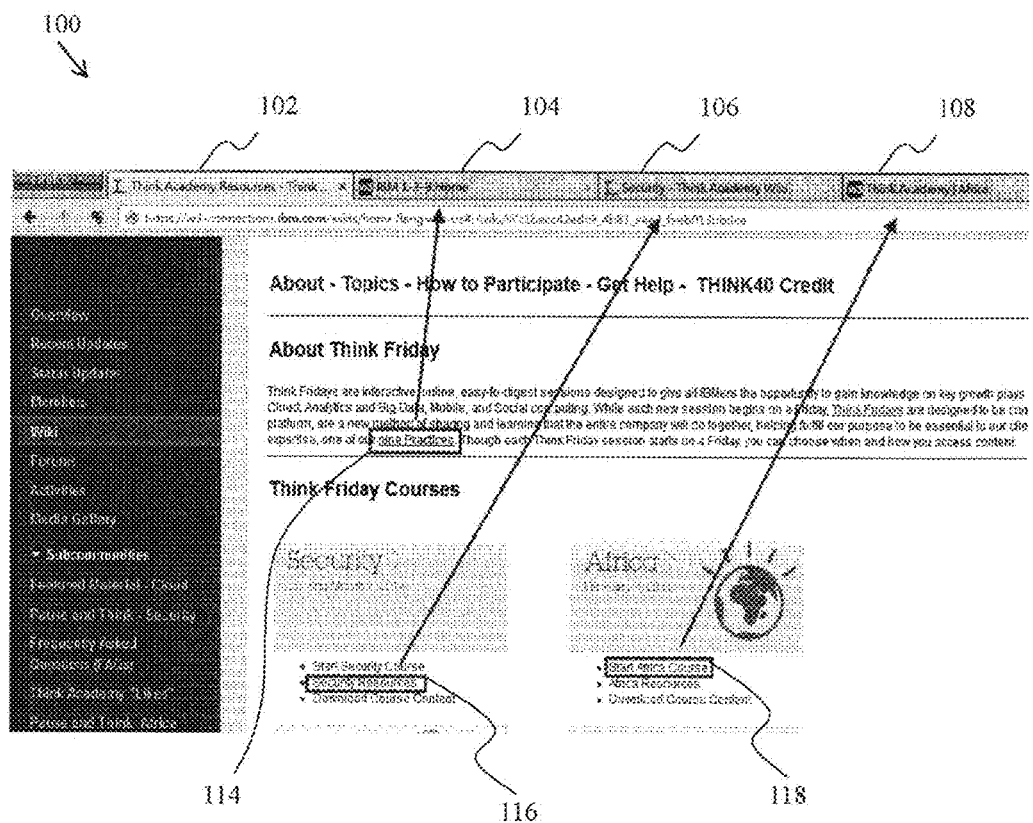
FIG. 1A is a frame of a webpage on a conventional browser display interface, in accordance with the prior art.
Figure 1B:
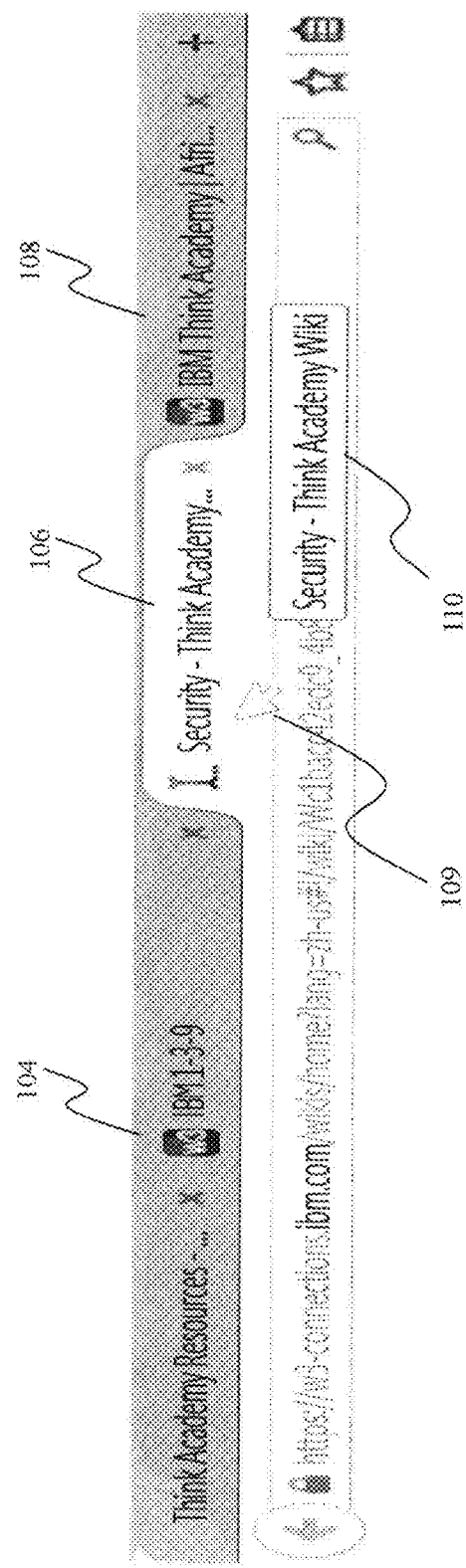
FIG. 1B shows a tab bar and a tooltip of a webpage on the conventional browser display interface, in accordance with the prior art.

Citation of "a specific embodiment" or a similar expression in the specification means that specific features, structures, or characteristics described in the specific embodiment are included in at least one specific embodiment of the present invention. Hence, the wording "in a specific embodiment" or a similar expression in this specification does not necessarily refer to the same specific embodiment.

As will be appreciated by one skilled in the art, the present invention may be embodied as a computer system, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 2 to FIG. 5 show a flowchart and a block diagram of a practical architecture, functions and operations of a system, a method and a computer program product according to embodiments of the present invention. Each block in the flowchart or block diagram may represent a module, a segment or a part of a program code, and may include one or more executable instructions to perform a designated logic function. It should be noted that, in other embodiments, the functions depicted by the blocks may be performed in a sequence other than that shown in the figures. For example, two connected blocks in each figure may both be performed, or, with certain functions involved or under certain circumstances, may be performed in a reverse sequence of the sequence shown in each figure. It should be also noted that, each block in each block diagram and/or each flowchart, and combinations of the blocks in each block diagram and/or each flowchart, may be implemented on the basis of a hardware system for a specific purpose or perform specific functions or operations by means of the combination of hardware and computer instructions for a specific purpose.

Figure 2:
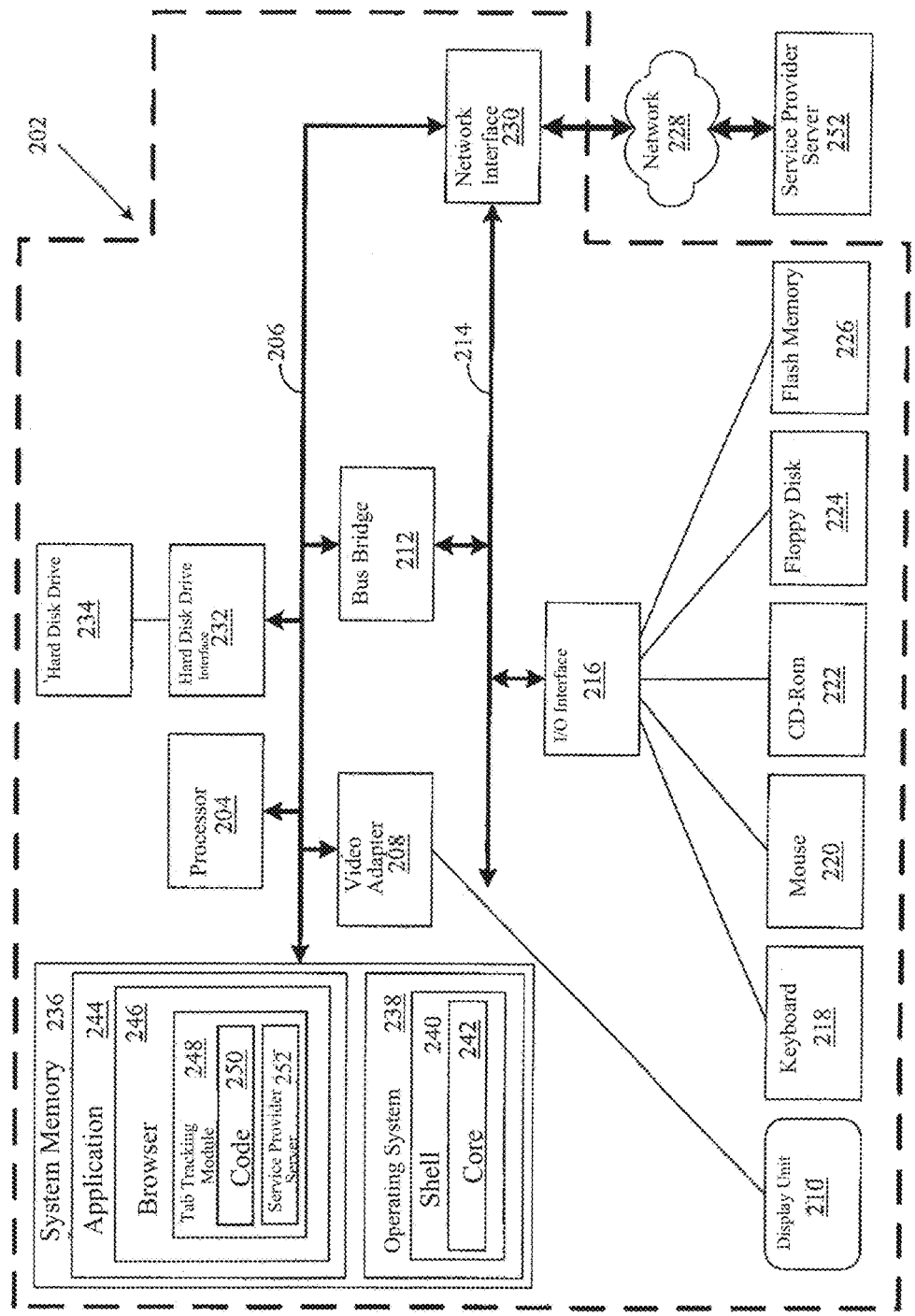
FIG. 2 is a schematic view of a hardware framework according to embodiments of the present invention.

FIG. 2 is a block diagram of the hardware environment of an illustrative client computer 202 according to the present invention. According to the present invention, a client computer is an electronic product which executes an application for providing instant messages, emails, short messages or any other application for transmitting data, including a desktop computer, notebook computer, terminal apparatus, mobile phone, or PDA. The client computer executes applications pertaining to word processing services or browsers. In an exemplary embodiment, the client computer is a universal desktop computer which comprises: a processor for executing various applications; a storage device for storing various information and code; a display device, a communication and input/output device, functioning as an interface for communication with the user; and a peripheral component or any other specific-purpose component. In another embodiment, the present invention is implemented in another manner and thus includes less or more other devices or components. A network is implemented in any form of connection, including a local area network (LAN) or wide area network (WAN) for use in fixed connection, or implemented in the form of dial-up Internet access gained through an Internet service provider, and is not restricted to various wired connections and various wireless connections. The network further comprises other hardware and software components (not shown), such as an additional computer system, a router, and a firewall.

The client computer 202 comprises a processor unit 204 coupled to a system bus 206. A video adapter 208 (which controls a display unit 210) is coupled to the system bus 206. The system bus 206 is coupled to an input/output (I/O) bus 214 through a bus bridge 212. An I/O interface 216 is coupled to the I/O bus 214. The I/O interface 216 communicates with each I/O device. The I/O devices include a keyboard 218, a mouse 220, a CD-ROM 222, a floppy disk 224, and a flash memory drive 226. Ports, which are connectable to the I/O interface 216, comply with one of port specifications well-known by persons skilled in the art on computer frameworks. The ports include, but are not limited to, a universal serial bus (USB) port.

With a network interface 230, the client computer 202 communicates with a service provider server 252 through a network 228. The network interface 230 is coupled to the system bus 206. The network 228 is an extranet (such as the Internet) or an intranet (such as Ethernet or a virtual personal network (VPN)). With the network 228, the client computer 202 accesses the service provider server 252 according to the present invention.

The network can also be implemented in any form of connection, including a local area network (LAN) or wide area network (WAN) for use in fixed connection, or implemented in the form of dial-up Internet access gained through an Internet service provider, and is not restricted to various wired connections and various wireless connections, for example, communicating with a computer device/system through a wireless network, such as GSM or Wi-Fi. The network further comprises other hardware and software components (not shown), such as an additional computer system, a router, and a firewall.

A hard disk drive interface 232 is coupled to the system bus 206. The hard disk drive interface 232 is connected to a hard disk drive 234. In a preferred embodiment, the hard disk drive 234 is populated with a system memory 236. The system memory 236 is coupled to the system bus 206. Data which populates the system memory 236 includes an application 244 and an operating system (OS) 238 of the client computer 202.

The OS 238 comprises a shell 240 and a core 242 whereby the user accesses resources, such as the application 244. The shell 240 is disposed between the user and an operating system and adapted to provide a program of an interface and an interpreter. The shell provides a system remind, interprets commands sent from a keyboard, mouse, or any other user input media, and sends to an appropriate low level (such as the core 242) of the operating system the interpreted commands for processing. Although the shell 240 is typically a text-based line-oriented user interface, the present invention can also support any other user interface modes, such as graphical mode, voice mode, and communicative motion mode. The core 242 comprises low-level functions of the OS 238. The low-level functions comprise basic services requested by the application 244 and the other portions of the OS 238. The basic services include memory management, process and task management, disk management, and mouse & keyboard management.

The application 244 comprises a browser 246. The browser 246 comprises program modules and instructions. The program modules and instructions comply with the HyperText Transfer Protocol (HTTP) whereby a client (i.e., the client computer 202) of the World Wide Web (WWW) sends/receives network messages to/from the Internet, thereby effectuating communication with the service provider server 252. The application 244 further comprises a tab tracking module 248. The tab tracking module 248 is implemented in the form of a daemon or a plug-in of the browser 246. In another embodiment, the tab tracking module 248 is implemented in the form of any other program. The tab tracking module 248 comprises code 250 for executing a program depicted in FIG. 5. In an embodiment, the client computer 202 downloads selected webpages through the service provider server 252.

In another embodiment, from the perspective of a framework and components, the client computer 202 can be a universal computer device, such as a personal computer (desktop computer or notebook computer), server, or information appliance, such as IBM WebSphere Datapower SOA Appliance or Tivoli ISS Appliances ("IBM," "WebSphere," and "Tivoli" are registered trademarks of International Business Machine in the United States and/or any other countries.) Furthermore, the client computer 202 can also be a mobile computation device, such as a smartphone, tablet, or personal digital assistant (PDA). A data input module of the smartphone and a display screen are integrated to form a touchscreen whereby the user creates data or inputs instructions.

The hardware components disposed in the client computer 202 as shown in FIG. 2 show essential components in the present invention in an illustrative rather than comprehensive manner. For instance, the client computer 202 can further comprise alternative memory storage devices, such as a magnetic cassette, digital versatile disc (DVD), Bernoulli Box, and the like. The above and other changes can be made to the present invention without departing from the spirit and scope of the present invention.

The present invention is hereunder further illustrated with one embodiment of a tab tracking module, which is not restrictive of the present invention as appreciated by skilled persons in the art.

The present invention provides a novel and intuitive sway for visually reminding users about webpage information of a parent tab associated with a new child tab as well as specifying, by coloring or any visually identifiable manner, a parent link in a parent webpage of a parent tab, where the parent link has been previously clicked for the creation of a new tab.

Figure 5:
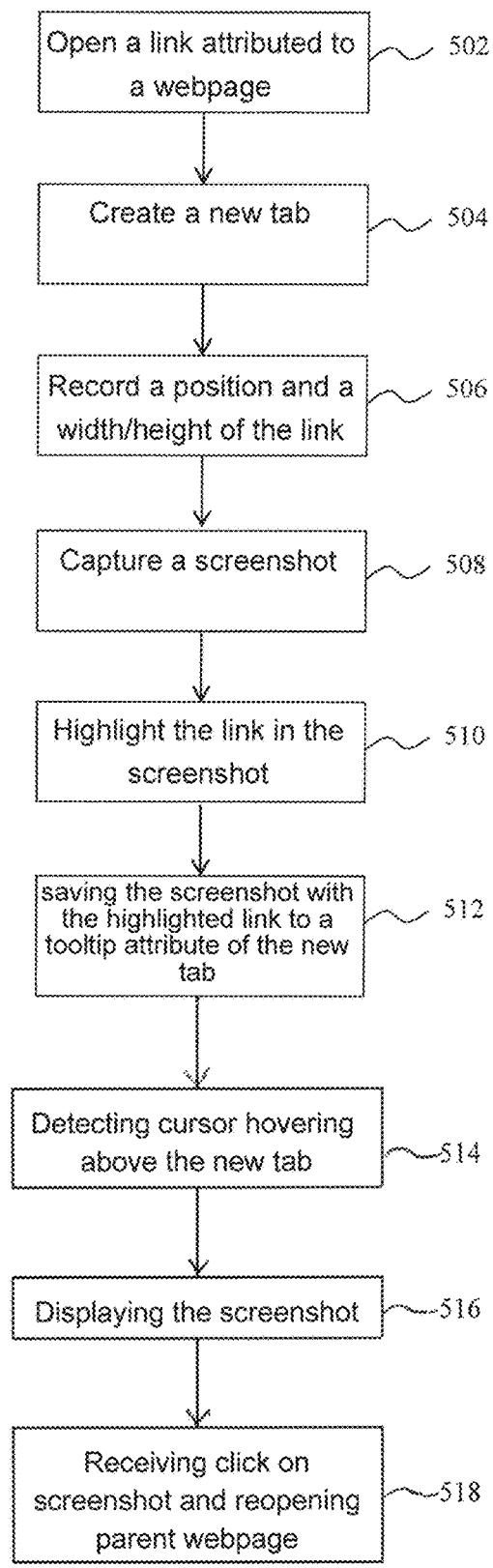
FIG. 5 is a flowchart of a method for use with a tab tracking module according to embodiments of the present invention.

FIG. 5 is a flowchart of a method for use with a tab tracking module 248 according to embodiments of the present invention. FIG. 5 is further illustrated by FIG. 3 that is a frame of a webpage on a browser display interface according to one embodiment of the present invention.

Step 502 opens a link from a parent webpage of a parent tab for identifying a new tab of a new webpage, in response to a click by a user on a link in the parent webpage of the parent tab. For example, after conducting a web search, the user clicks on multiple links in a resultant webpage obtained from the search, which opens the multiple links and enables viewing the multiple webpages intended to be visited. Thus, step 502 comprises receiving a click on one or more links included in a parent webpage being displayed on a graphical user interface (GUI) on which a parent tab associated with the parent webpage is displayed.

Step 504 creates the new tab when the link is open and displays the new tab on the GUI and/or replaces the parent webpage of the parent tab with the new webpage of the new tab.

Step 506 records the position and a width/height of the link.

Step 508 captures a screen of the parent webpage 102 to generate a screenshot, by triggering a snapshot mechanism.

Step 510 visually highlights the clicked link in the screenshot. In one embodiment, the link is circled by a slender frame, such as a slender frame 116 shown in FIG. 3. Any other suitable way enabling the link to be visually highlighted is applicable according to the present invention; for example, the links can be highlighted with a differentiated color or font.

Step 512 saves the screenshot with the highlighted link to a tooltip attribute of the new tab.

Figure 3:
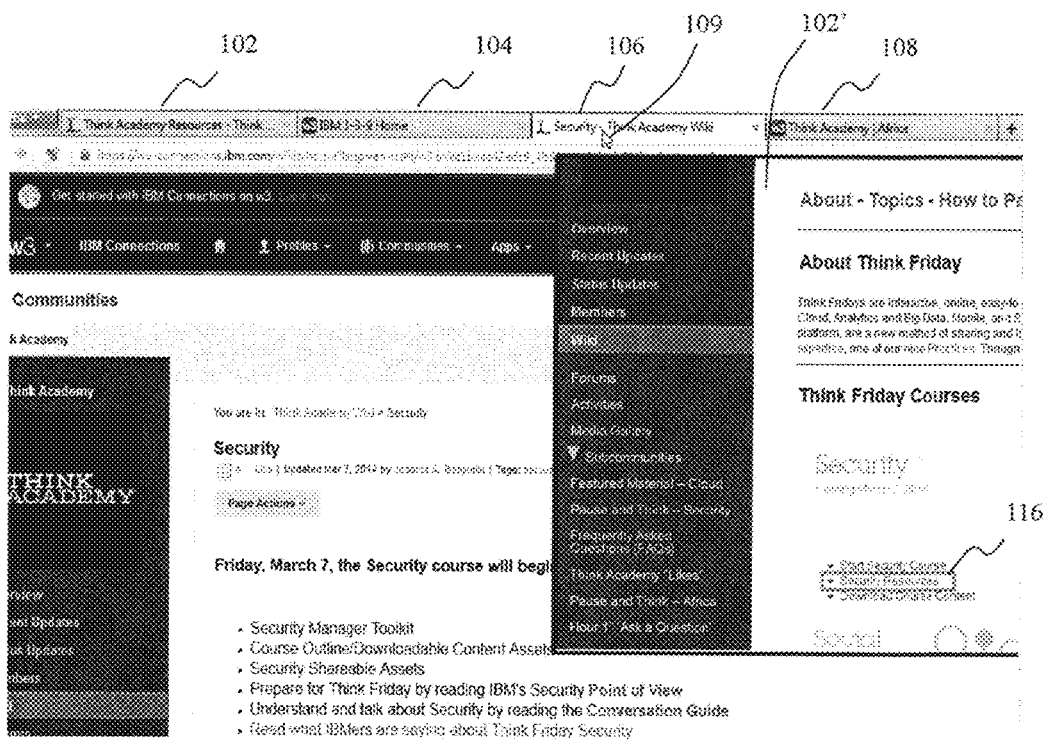
FIG. 3 is a frame of a webpage on a browser display interface according to one embodiment of the present invention.

As shown in FIG. 3, step 514 detects the cursor 109 of a pointing device (e.g., a mouse) of a user hovering above the active new tab 106 and in response, step 516 retrieves the screenshot from the tooltip attribute and displays to the user on the GUI the screenshot 102' having the highlighted link 116. The screenshot was created in step 508 by the capture of the screen of the parent webpage. Thus, the user can easily track webpage information of the parent tab associated with the new tab.

Step 518 receives, while the screenshot is being displayed, a click on the screenshot and in response, the parent webpage is reopened in the GUI.

In one embodiment, the screenshot 102' is configured to cover the window totally or cover the window in part as shown in FIG. 3, and is even configured to integrate with scroll bar functionality. Alternatively, even if the webpage of the parent tab has been closed, the webpage of the parent tab can be re-opened by clicking on the screenshot to load the parent URL.

Illustrative code for the steps of FIG. 5 is as follows:

```
// when user clicks a link
function click_event_fired (object domElement){
    int ele_height = domElement.offsetHeight;
    int ele_width = domElement.ofsetWidth;
    //get position
    var client_x = 0;
    var client_y = 0;
    while( domElement!= null){
        client_y += domElement.offsetTop;
        client_x += domElement.offsetLeft;
        domElement = domElement.offsetParent;
    }
    // capture screen
    capturePage_drawRect(window, domElement, thisFilename,
    client_x, client_y, ele_width, ele_height);
    tabImageMapping[thisTabId] = thisFilename;
}
// function to capture a page and draw rectangle
function capturePage_drawRect(window, myElement, filename, x, y, eleWidth, eleHeight)
{
    var grabber = {
        prepareCanvas: function(width, height) {
            var styleWidth = width + 'px';
            var styleHeight = height + 'px';
            var grabCanvas = document.getElementById('screenshot_canvas');
            if (!grabCanvas) {
                // create the canvas
                var ns ='http://www.w3.org/1999/xhtml';
                grabCanvas = document.createElementNS(ns, 'html:canvas');
                grabCanvas id = 'screenshot_canvas';
                grabCanvas.style.display = 'none';
                document.documentElement.appendNew child(grabCanvas);
            }
            grabCanvas.width = width;
            grabCanvas.style.width = styleWidth;
            grabCanvas.style.maxWidth = styleWidth;
            grabCanvas.height = height;
            grabCanvas.style.height = styleHeight;
            grabCanvas.style.maxHeight = styleHeight;
            return grabCanvas;
        },
```

```
    prepareContext: function(canvas, box) {
      var context = canvas.getContext('2d');
      context.clearRect(box.x, box.y, box.width, box.height);
      context.save();
      return context;
    }
  };
  var SGNsUtils = {
    dataUrlToBinaryInputStream: function(dataUrl) {
      var nsIoService = Components.classes["@mozilla.org/network/io-service;1"]
        .getService(Components.interfaces.nsIIOService);
      var channel = nsIoService
        .newChannelFromURI(nsIoService.newURI(dataUrl, null, null));
      var binaryInputStream = Components.classes["@mozilla.org/binaryinputstream;1"]
        .createInstance(Components.interfaces.nsIBinaryInputStream);
      binaryInputStream.setInputStream(channel.open());
      return binaryInputStream;
    },
    newFileOutputStream: function(nsFile) {
      var writeFlag = 0x02; // write only
      var createFlag = 0x08; // create
      var truncateFlag = 0x20; // truncate
      var fileOutputStream = Components.classes["@mozilla.org/network/
      file-output-stream1"]
        .createInstance(Components.interfaces.nsIFileOutputStream);
      fileOutputStream.init(nsFile,
        writeFlag | createFlag | truncateFlag,
        0664,
        null);
      return fileOutputStream;
    },
    writeBinaryInputStreamToFileOutputStream:
    function(binaryInputStream, fileOutputStream) {
      var numBytes = binaryInputStream.available();
      var bytes = binaryInputStream.readBytes(numBytes);
      fileOutputStream.write(bytes, numBytes);
    }
  };
  var doc = window.document.documentElement;
  var box;
        box = {
        x: 0,
        y: 0,
        width: doc.scrollWidth,
        height: doc.scrollHeight
        };
  var originalBackground = doc.style.background;
  // grab
  var format = 'png';
  var canvas = grabber.prepareCanvas(box.width, box.height);
  var context = grabber.prepareContext(canvas, box);
  context.drawWindow(window, box.x, box.y, box.width, box.height,
    'rgb(0, 0, 0)');
  context.restore();
  // draw square
  context.beginPath();
  context.lineWidth="6";
  context.strokeStyle="red";
  context.rect(x,y,eleWidth,eleHeight);
  context.fill();
  var dataUrl = canvas.toDataURL("image/" + format);
  // save to file
  var nsFile = Components.classes["@mozilla.org/file/local;1"]
    .createInstance(Components.interfaces.nsILocalFile);
  try {
    nsFile.initWithPath(filename);
  }
  catch (e) {
    if (/NS_ERROR_FILE_UNRECOGNIZED_PATH/.test(e.message)) {
      // try using the opposite file separator
      if (filename.indexOf('/') != -1) {
        filename = filename.replace(/\//g, '\\');
      }
      else {
        filename = filename.replace(/\\/g,'/');
      }
      nsFile.initWithPath(filename);
    }
```

```
    else {
       throw e;
    }
  }
  var binaryInputStream = SGNsUtils.dataUrlToBinaryInputStream(dataUrl);
  var fileOutputStream = SGNsUtils.newFileOutputStream(nsFile);
  SGNsUtils.writeBinaryInputStreamToFileOutputStream(binaryInputStream,
     fileOutputStream);
  fileOutputStream.close( );
};
```

Figure 4:
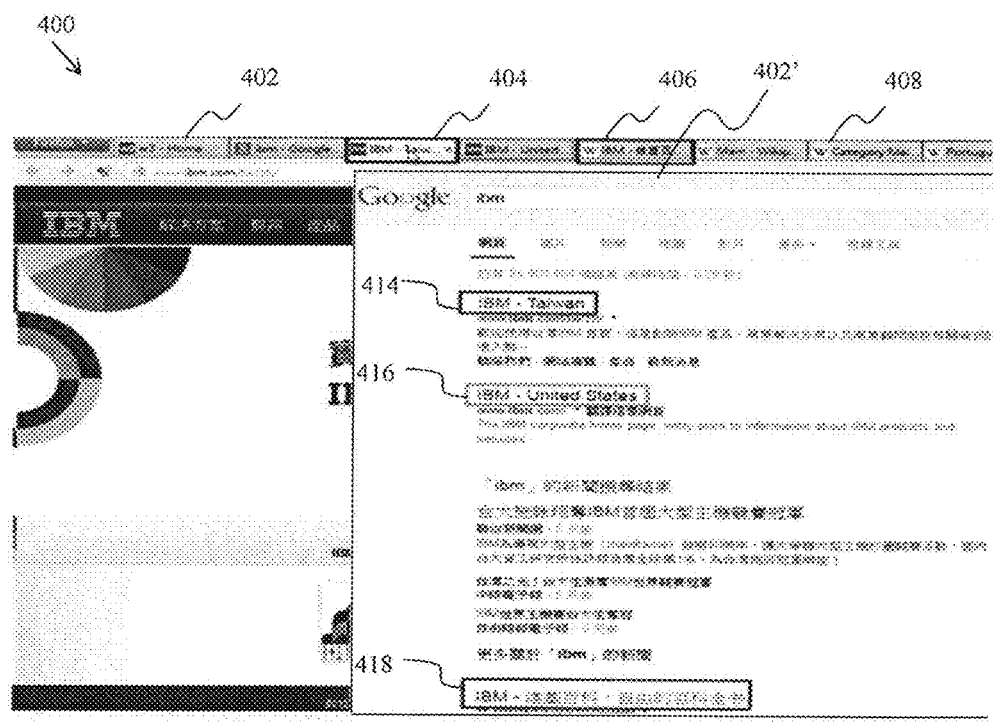
FIG. 4 is a frame of a webpage on the browser display interface according to one embodiment of the present invention.

FIG. 4 is a frame of a webpage on the browser display interface according to one embodiment of the present invention. Step 510 in FIG. 5 comprises enabling all links being clicked in the same parent webpage of the parent tab 102 to be highlighted in the screenshot. Step 510 further comprises enabling the links to correspond each different tab by visually distinguishing the different tabs. Referring to FIG. 4, the links 414, 416, 418 are circled by slender frames in different colors that correspond to tabs 404, 406, 408 having corresponding colors, respectively.

A computer program product of the present invention comprises a computer readable hardware storage device having computer readable program code stored therein, said program code containing instructions executable by a processor of a computer system to implement the methods of the present invention.

A computer system of the present invention comprises a processor, a memory, and a computer readable hardware storage device, said storage device containing program code executable by the processor via the memory to implement the methods of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing detailed description of the embodiments is used to further clearly describe the features and spirit of the present invention. The foregoing description for each embodiment is not intended to limit the scope of the present invention. All kinds of modifications made to the foregoing embodiments and equivalent arrangements should fall within the protected scope of the present invention. Hence, the scope of the present invention should be explained most widely according to the claims described thereafter in connection with the detailed description, and should cover all the possibly equivalent variations and equivalent arrangements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, said method comprising:
receiving, by a processor of a computer system, a click on a first link included in a parent webpage being displayed on a graphical user interface (GUI) on which a parent tab associated with the parent webpage is displayed;
in response to said receiving the click on the first link included in the parent webpage, said processor: (i) creating, on the GUI, a new tab corresponding to the first link that was clicked, (ii) displaying the new tab on the GUI, (iii) replacing the parent webpage by a new webpage associated with the first link resulting in the parent webpage no longer being displayed, and (iv) generating and saving a screenshot of the parent webpage to a tooltip attribute of the new tab, said generating and saving the screenshot comprising marking the first link for being highlighted during subsequent display of the saved screenshot;
after said generating and saving the screenshot, said processor detecting a cursor of a pointing device hovering above the new tab;
in response to said detecting the cursor hovering above the new tab, said processor retrieving the screenshot from the tooltip attribute and persistently displaying, on the GUI, the retrieved screenshot with the first link being highlighted; and
during said displaying the screenshot and with said hovering above the new tab no longer occurring, said processor receiving a click on the screenshot and in response, said processor reopening the parent webpage in the GUI.

2. The method of claim 1, wherein said marking the first link comprises marking the first link for being circled by a slender frame during subsequent display of the saved screenshot.

3. The method of claim 1, wherein said marking the first link comprises marking the first link for being highlighted by a distinguishing color or font during subsequent display of the saved screenshot.

4. The method of claim 1, said method further comprising:
in further response to said receiving the click on the first link, said processor recording a position of the first link.

5. The method of claim 1, said method further comprising:
in further response to said receiving the click on the first link, said processor recording a width/height of the first link.

6. A computer program product, comprising a computer readable hardware storage device having computer readable program code stored therein, said program code containing instructions executable by a processor of a computer system to implement a method, said method comprising:
said processor receiving a click on a first link included in a parent webpage being displayed on a graphical user interface (GUI) on which a parent tab associated with the parent webpage is displayed;
in response to said receiving the click on the first link included in the parent webpage, said processor: (i) creating, on the GUI, a new tab corresponding to the first link that was clicked, (ii) displaying the new tab on the GUI, (iii) replacing the parent webpage by a new webpage associated with the first link resulting in the parent webpage no longer being displayed, and (iv) generating and saving a screenshot of the parent webpage to a tooltip attribute of the new tab, said generating and saving the screenshot comprising marking the first link for being highlighted during subsequent display of the saved screenshot;

after said generating and saving the screenshot, said processor detecting a cursor of a pointing device hovering above the new tab;

in response to said detecting the cursor hovering above the new tab, said processor retrieving the screenshot from the tooltip attribute and persistently displaying, on the GUI, the retrieved screenshot with the first link being highlighted; and during said displaying the screenshot and with said hovering above the new tab no longer occurring, said processor receiving a click on the screenshot and in response, said processor reopening the parent webpage in the GUI.

7. The computer program product of claim 6, wherein said marking the first link comprises marking the first link for being circled by a slender frame during subsequent display of the saved screenshot.

8. The computer program product of claim 6, wherein said marking the first link comprises marking the first link for being highlighted by a distinguishing color or font during subsequent display of the saved screenshot.

9. A computer system, comprising a processor, a memory coupled to the processor, and a computer readable storage device coupled to the processor, said storage device containing program code executable by the processor via the memory to implement a method, said method comprising:

said processor receiving a click on a first link included in a parent webpage being displayed on a graphical user interface (GUI) on which a parent tab associated with the parent webpage is displayed;

in response to said receiving the click on the first link included in the parent webpage, said processor: (i) creating, on the GUI, a new tab corresponding to the first link that was clicked, (ii) displaying the new tab on the GUI, (iii) replacing the parent webpage by a new webpage associated with the first link resulting in the parent webpage no longer being displayed, and (iv) generating and saving a screenshot of the parent webpage to a tooltip attribute of the new tab, said generating and saving the screenshot comprising marking the first link for being highlighted during subsequent display of the saved screenshot;

after said generating and saving the screenshot, said processor detecting a cursor of a pointing device hovering above the new tab;

in response to said detecting the cursor hovering above the new tab, said processor retrieving the screenshot from the tooltip attribute and persistently displaying, on the GUI, the retrieved screenshot with the first link being highlighted; and during said displaying the screenshot and with said hovering above the new tab no longer occurring, said processor receiving a click on the screenshot and in response, said processor reopening the parent webpage in the GUI.

10. The computer system of claim 9, wherein said marking the first link comprises marking the first link for being circled by a slender frame during subsequent display of the saved screenshot.

11. The computer system of claim 9, wherein said marking the first link comprises marking the first link for being highlighted by a distinguishing color or font during subsequent display of the saved screenshot.

* * * * *